United States Patent
Blong et al.

[11] Patent Number: 6,077,609
[45] Date of Patent: Jun. 20, 2000

[54] COMPOSITE ARTICLES INCLUDING FLUOROPOLYMERS AND NON-FLUORINATED POLYMERS AND METHOD FOR MAKING THE SAME

[75] Inventors: Thomas J. Blong, Woodbury; Edward E. Parsonage, St. Paul, both of Minn.

[73] Assignee: Dyneon LLC, Oakdale, Minn.

[21] Appl. No.: 08/883,985

[22] Filed: Jun. 27, 1997

[51] Int. Cl.[7] .......................... B32B 27/00; B32B 27/08; B32B 27/30

[52] U.S. Cl. .......................... 428/412; 428/421; 428/422; 428/474.4

[58] Field of Search .................... 428/421, 422, 428/36.91, 412, 474.4, 475.5

[56] References Cited

U.S. PATENT DOCUMENTS

| | | | |
|---|---|---|---|
| 4,343,861 | 8/1982 | Stivers | 428/413 |
| 4,421,878 | 12/1983 | Close | 523/454 |
| 4,606,952 | 8/1986 | Sugimoto et al. | 428/36 |
| 5,383,087 | 1/1995 | Noone et al. | 361/215 |
| 5,626,930 | 5/1997 | Fukushi | 428/36.9 |
| 5,658,670 | 8/1997 | Fukushi et al. | 428/421 |
| 5,763,068 | 6/1998 | Kishino et al. | 428/323 |
| 5,804,670 | 9/1998 | Stoeppelmann | 525/420 |

*Primary Examiner*—Paul Thibodeau
*Assistant Examiner*—Ramsey Zacharia
*Attorney, Agent, or Firm*—James V. Lilly

[57] ABSTRACT

A composite article is provided which includes a blend component having first and second surfaces and a substantially non-fluorinated polymer component adhered to the first surface of the blend component, wherein the substantially non-fluorinated polymer component has an exposed surface. The blend component includes a first hydrogen containing fluoropolymer; and a substantially non-fluorinated polymer having one or more pendant primary or secondary amine groups. Increased adhesion is observed by a peel strength value between the blend component and the substantially non-fluorinated polymer component when compared to a peel strength value between a component consisting of a fluoropolymer and a component consisting of a substantially non-fluorinated polymer having pendant primary or secondary amine groups.

41 Claims, 1 Drawing Sheet

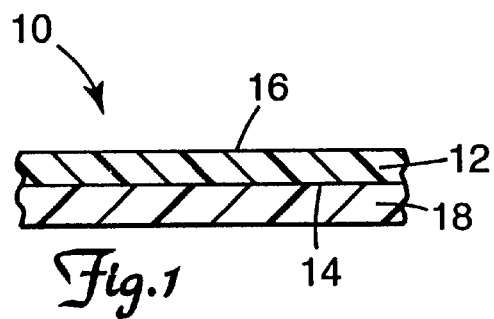
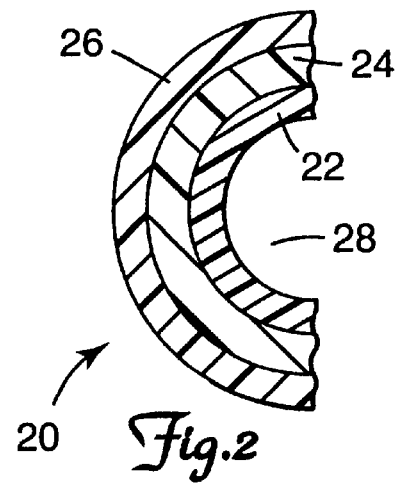
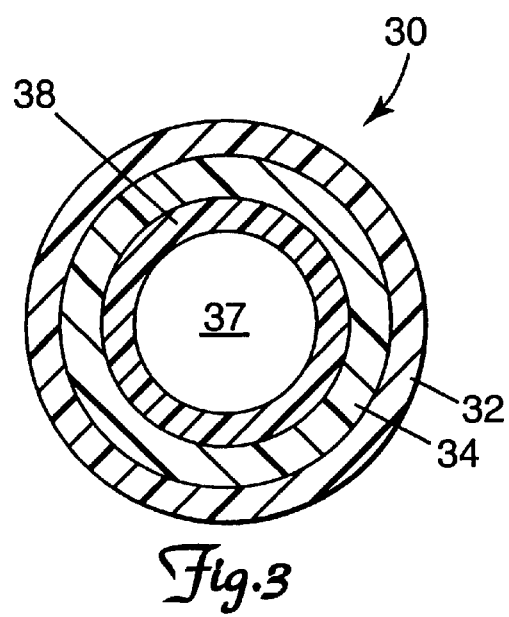
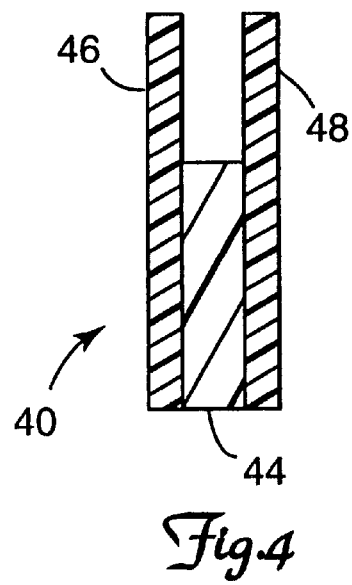

COMPOSITE ARTICLES INCLUDING FLUOROPOLYMERS AND NON-FLUORINATED POLYMERS AND METHOD FOR MAKING THE SAME

BACKGROUND OF THE INVENTION

Fluoropolymers, or fluorine-containing polymers, are a commercially important class of materials. Fluoropolymers include, for example, crosslinked fluorocarbon elastomers and semi-crystalline or glassy fluorocarbon plastics. Fluorocarbon plastics (or fluoroplastics) are generally of high thermal stability and are particularly useful at high temperatures. They also exhibit extreme toughness and flexibility at very low temperatures. Many of these fluoroplastics are almost totally insoluble in a wide variety of solvents and are generally chemically resistant. Some have extremely low dielectric loss and high dielectric strength, and many have unique nonadhesive and low-friction properties. See, for example, F. W. Billmeyer, *Textbook of Polymer Science*, $3^{rd}$ ed., pp. 398–403, John Wiley & Sons, New York (1984).

Fluorocarbon elastomers, particularly the copolymers of vinylidene fluoride with other ethylenically unsaturated halogenated monomers, such as hexafluoropropene, have particular utility in high temperature applications, such as seals, gaskets, and linings. See, for example, R. A. Brullo, "Fluoroelastomer Rubber for Automotive Applications," *Automotive Elastomer & Design*, June 1985, "Fluoroelastomer Seal Up Automotive Future," *Materials Engineering*, October 1988, and W. M. Grootaert, et al., "Fluorocarbon Elastomers," Kirk-Othmer, *Encyclopedia of Chemical Technology*, Vol. 8, pp. 990–1005 ($4^{th}$ ed., John Wiley & Sons, 1993).

Fluoroplastics, particularly polychlorotrifluoroethylene, polytetrafluoroethylene, copolymers of tetrafluoroethylene, hexafluoropropylene, perfluoropropyl vinyl ether, and poly (vinylidene fluoride), have numerous electrical, mechanical, and chemical applications. Fluoroplastics are useful, for example, in wire coatings, electrical components, seals, solid and lined pipes, and piezoelectric detectors. See, for example, "Organic Fluorine Compounds," Kirk-Othmer, *Encyclopedia* of Chemical Technology, Vol. 11, pp., 20, 21, 32, 33, 40, 41, 50, 52, 62, 70, 71 (John Wiley & Sons, 1980).

In the automotive industry, for example, increased concern with evaporative fuel standards has led to the need for fuel system components that have improved barrier properties. This helps reduce the permeation of fuel vapors through automotive elements such as fuel filler lines, fuel supply lines, fuel tanks, and other elements of an automobile fuel system. Multi-layer tubing and other articles containing a fluorinated layer have been used in such automotive elements to provide a chemically resistant permeation barrier. Multi-layer articles are also useful in a number of other industries including, for example, the chemical processing and/or handling industries, and the electrical and electronics industries. Such multi-layer articles can include one or more other layers that can add strength, rigidity, or other mechanical properties.

Multi-layer compositions comprising a fluorinated polymer layer and a polyamide or polyolefin layer are known. See, for example, U.S. Pat. No. 4,933,090 (Krevor) which discloses laminate tubular articles that can include layers of fluorocarbon elastomers, and International Publication No. WO 93/1493 (LaCourt) which discloses a laminar film structure that includes a polyimide and a fluoropolymer.

To be useful, these multi-layer articles should not delaminate during use. That is, the adhesive bond strength between the layers of the multi-layer article should be sufficient to prevent the layers from separating. A variety of methods have been employed to increase the bond strength between a layer comprising a fluoropolymer and a layer comprising a substantially non-fluorinated polymer. For example, a layer of adhesive can be added between the two layers. However, the adhesive used must not limit the performance of the multi-layer article.

As an alternative to, or in addition to, adhesives, surface treatment of one or both of the layers has been used to increase the adhesive bond strength between the layers. For example, layers comprising a fluoropolymer have been treated with a charged gaseous atmosphere followed by application of a layer of thermoplastic polyamide. Such surface treatments add additional steps and cost to the manufacturing process and are limited to non-coextrusion processes.

In another approach, the adhesion between a substantially non-fluorinated polymer and a fluoropolymer, wherein the fluoropolymer is derived from vinylidene fluoride (VDF), and optionally hexafluoropropylene (HFP), has been found to increase upon exposure of the fluoropolymer to an amine compound. An example includes providing a fluoropolymer comprising interpolymerized units derived from vinylidene fluoride, a layer of a melt-processable, substantially non-fluorinated polymer, and a melt-processable aliphatic di- or polyamine of less than 1,000 molecular weight.

In contrast, fluoropolymers derived from fluorinated monomers that include substantially no VDF are known to be more chemically inert than fluoropolymers derived from VDF monomers, and are more resistant to chemical attack. Thus, such fluoropolymers are ideal for use in composite applications (e.g., articles having multi-layers) where a more resistant barrier layer is desired, such as automotive hose applications. Such articles combine the chemical resistance of the fluoropolymer with the structural properties of a generally thicker and lower cost hydrocarbon material. Examples of such substantially non-VDF derived fluoropolymers include fluoropolymers derived from monomers of tetrafluoroethylene (TFE), hexafluoropropylene (HFP), chlorotrifluoroethylene (CTFE), and optional non-fluorinated monomers. The chemical resistance provided by these fluoropolymers make such composite articles useful as automotive fuel lines, fuel tanks, other elements of automobile systems, as well as liners, tubing and containers in chemical processing and any other use where chemically resistant barriers are desired.

However, because of the improved chemical resistance of these substantially non-VDF derived fluoropolymers, they are also less likely to undergo adhesion-promoting reactions with amines. Although some degree of adhesion may be obtained on exposure of a substantially non-VDF containing fluoropolymer to an amine, many applications will benefit from, and may require, higher adhesion to a fluoropolymer that provides a chemically resistant barrier. Thus, poor adhesion between the non-VDF containing fluoropolymer and a hydrocarbon material makes formation of useful composite articles difficult.

What is yet needed is a composite article that includes a barrier comprising a fluoropolymer that provides improved adhesion to a substantially non-fluorinated polymeric substrate.

SUMMARY OF THE INVENTION

In accordance with the invention, one embodiment is a composite article comprising a blend component having first and second surfaces, and a substantially non-fluorinated polymer component adhered to the first surface of the blend component. The blend component comprises a first hydrogen containing fluoropolymer; and a substantially non-fluorinated polymer having one or more pendant primary or secondary amine groups. As used herein, "blend" means that the polymers are mixed together. These polymers can be mixed by any conventional method, including solution mixing, melt-mixing or dispersion mixing.

It was found that this embodiment of the invention improved adhesion between a fluoropolymer component and a component including a substantially non-fluorinated polymer.

In another embodiment of the invention, a composite article includes a second fluorinated polymer component adhered to the second surface of the blend component.

In yet another embodiment of the invention, a multi-layer composite article includes, in order, a first layer comprising a fluoropolymer, a second blend layer comprising a first fluoropolymer and a substantially non-fluorinated polymer having one or more pendant primary or secondary amine groups, and a third layer comprising a substantially non-fluorinated polymer layer.

Another embodiment of the invention includes a method for adhering a substantially non-fluorinated polymer component to a fluoropolymer component. The method comprises the steps of providing (A) the non-fluorinated polymer, (B) a blend of (i) a first fluoropolymer, and (ii) a non-fluorinated polymer having one or more pendant primary or secondary anine groups; and adhering the non-fluorinated polymer (A) to the blend (B).

This method provides composite articles (e.g., multi-layer articles) having improved adhesive bond strength between the components. The composite articles of the invention can be shaped articles, such as a wire coating, a tube, or hose, a container, a sheet, a cable jacket, and a film. The invention provides composite articles suitable for use in motor vehicles, for example, as fuel-line hoses, chemical handling and processing, wire and cable applications, sheets or films, blow-molded and extruded articles such as bottles, tubes, etc. The articles of the invention are especially useful where chemical resistance and barrier properties are important.

BRIEF DESCRIPTION OF THE SEVERAL VIEWS OF THE DRAWING

FIGS. 1–3 are cross-sectional views of various embodiments of a composite article of the invention; and FIG. 4 is a cross-sectional view of a layered construction used in testing adhesion of a composite article in accordance with the invention.

The FIGS. are not intended to limit the present invention. Consequently, it is understood that the specific constructions are illustrative only. In these several views, similar reference numbers refer to the same elements.

DESCRIPTION OF PREFERRED EMBODIMENTS

The various embodiments of the invention utilize fluorinated polymers (also known as fluoropolymers). Fluoropolymers used in the invention include vinylidene fluoride containing fluoropolymers and substantially non-vinylidene fluoride containing fluoropolymers. Additionally, the fluoropolymers used in the invention include both fluoroplastics (also known as fluorothermoplastics) and fluoroelastomers. Preferably, the fluoropolymers are fluoroplastics.

Fluoroplastics are distinguished from fluoroelastomers or fluororubbers by their properties. Fluoroplastic materials are melt-processable and have either a melt point and are semi-crystalline, or have a glass transition temperature above ambient temperature. In contrast, fluoroelastomers or fluororubbers are generally amorphous and usually do not exhibit a melt point. While some fluoroelastomers may be melt-processable, a curing step is typically used in making finished articles of fluoroelastomers. The curing step generally results in a material with substantially reduced melt-processability. The terms fluoroelastomer and fluororubber are generally used interchangeably. See, for example, American Society for Testing and Materials (ASTM) D 1566 for elastomer and rubber definitions.

Vinylidene Fluoride Containing Fluoropolymers

These fluoropolymers are derived from vinylidene fluoride ("VF2" or "VDF") and fluoropolymers derived from other monomers which, when polymerized, form monomer sequences similar to polymerized vinylidene fluoride. In general, these fluoropolymers will readily dehydrofluorinate when exposed to a base. As a result, such fluoropolymers undergo relatively facile reactions with amine components. These reactions can result in improved adhesion. These other monomers include ethylenically unsaturated monomers which, when incorporated into fluoropolymers, can produce a similar (including an identical) polymeric microstructure as the polymerized VDF. These similarly formed polymers are also prone to dehydrofluorination and a subsequent adhesion promoting reaction with an amine. In general, the microstructure of a carbon bonded hydrogen atom between carbon bonded fluorine atoms creates an amine reactive site. The reactivity of a carbon bonded hydrogen is further enhanced when its carbon atom is adjacent to, or attached to a carbon atom possessing a carbon bonded —$CF_3$ group (supplied by HFP or 2-hydropentafluoropropylene for instance) or another electron withdrawing group. Monomers suitable for forming such carbon-bonded-hydrogen reactive sites include, but are not limited to, VDF, 1-hydropentafluoropropene, 2-hydropentafluoropropene, and trifluoroethylene.

Preferably, these VDF-containing fluoropolymers are easily prone to dehydrofluorination and are also prone to a subsequent adhesion promoting reaction with an amine. The carbon-bonded-hydrogen sites produced upon copolymerization of these monomers, including VDF, can be pre-dehydrofluorinated (prior to blend formation) to form double bonds within the backbone of the fluoropolymer. While not wishing to be bound by any particular theory, it is believed that preformation of these double bonds may accelerate the amine adhesion promoting reaction. This dehydrofluorination reaction may also be produced in situ, e.g., during processing. This in situ dehydrofluorination reaction may be aided by the use of an appropriate catalyst, preferably of the type discussed below. Such VDF-containing fluoropolymers comprise at least 3% by weight of interpolymerized units derived from VDF or other monomers with similar reactivity when polymerized. These VDF-containing fluoropolymers may be homopolymers or copolymers with other ethylenically unsaturated monomers. More preferably, the VDF-containing fluoropolymer is formed from (i) a fluorine-containing monomer selected from the group of vinylidene fluoride, trifluoroethylene, 1-hydropentafluoropropylene, 2-hydropentafluoropropylene, mixtures thereof, and optionally (ii) at least one monomer copolymerizable therewith. In one preferred embodiment, the VDF-containing fluoropolymer comprises a hexafluoropropylene-vinylidene fluoride polymer.

Such VDF-containing fluoropolymers (homopolymers, copolymers, terpolymers, etc.) can be made by well-known conventional means, for example by, free-radical polymerization of VDF with or without other ethylenically unsaturated monomers. The preparation of colloidal, aqueous dispersions of such polymers and copolymers is described, for example, in U.S. Pat. No. 4,335,238 (Moore et al.). Customary processes for making such amine-reactive fluoropolymers can include copolymerizing fluorinated olefins in aqueous, colloidal dispersions, which is carried out in the presence of water-soluble initiators which produce free radicals, such as, for example, ammonium or alkali metal persulfates or alkali metal permanganates, and in the presence of emulsifiers, such as, in particular, the ammonium or alkali metal salts of perfluorooctanoic acid.

These VDF-containing fluoropolymers useful in this invention can optionally include other useful fluorine-containing monomers such as hexafluoropropene (HFP), tetrafluoroethylene (TFE), chlorotrifluoroethylene (CTFE), 2-chloropentafluoropropene, a fluorinated vinyl ether, including a perfluoroalkyl vinyl ether such as $CF_3OCF=CF_2$ or $CF_3CF_2CF_2OCF=CF_2$. Certain fluorine-containing di-olefins are also useful, such as, perfluorodiallylether and perfluoro-1,3-butadiene.

The VDF-containing fluoropolymers useful in this invention may also comprise interpolymerized units derived from fluorine-free, unsaturated olefin comonomers, e.g., ethylene, propylene or butadiene. Preferably, at least 50% by weight of all monomers in a polymerizable mixture are fluorine-containing. The VDF-containing fluorine-containing monomer may also be copolymerized with iodine- or bromine-containing unsaturated olefin monomer. These monomers, sometimes referred to as cure-site monomers, are useful to prepare a peroxide curable polymer. Suitable cure-site monomers include terminally unsaturated monoolefins of 2 to 4 carbon atoms such as bromodifluoroethylene, bromotrifluoroethylene, iodotrifluoroethylene, and 4-bromo-3,3,4,4-tetrafluoro-1-butene.

Useful commercially available VDF-containing fluoropolymer materials include, for example, THV 200, THV 400, THV 500G fluoropolymer (available from Dyneon LLC, St. Paul, Minn), KYNAR 740 fluoropolymer (available from Atochem North America, Philadelphia, Pa.), HYLAR 700 (available from Ausimont USA, Inc., Morristown, N.J.), and FLUOREL FC-2178 (available from Dyneon LLC).

Substantially Non-vinylidene Fluoride Containing Fluoropolymers

These fluoropolymers typically do not contain VDF monomer (or any other similar monomer) at a level such that, when polymerized, produces a microstructure which is readily susceptible to reaction with a base, i.e., those that will dehydrofluorinate when exposed to a base, such as an amine. Hence, these fluoropolymers are referred to herein as "substantially non-vinylidene fluoride (non-VDF) containing fluoropolymers." By "substantially non-VDF containing," it is meant that the fluoropolymer preferably is substantially free from interpolymerized units derived from VDF monomer, or other monomers which provide a microstructure similar to that described above. These fluoropolymers preferably comprise less than 3%, more preferably less than 1% by weight of interpolymerized units derived from VDF or other monomers which produce a microstructure similar to that described above.

Useful substantially non-VDF containing fluoropolymers include melt processable fluoroplastics formed from polymerizing one or more fluorine-containing monomers selected from the group of HFP, TFE, CTFE, and a fluorinated vinyl ether, and may optionally include one or more cure site monomers. Such cure site monomers are typically iodide- or bromide- containing unsaturated olefins. Preferably the cure site monomers are terminally unsaturated monoolefins that contain from 2 to 4 carbon atoms. Examples of useful cure site monomers include bromodifluoroethylene, bromotrifluoroethylene, iodotrifluoroethylene, 4-bromo-3,3,4,4-tetrafluorobutene-1, and mixtures thereof. Particularly useful fluorine-containing monomers are HFP, TFE, and CTFE.

The fluorine-containing monomer used to make the non-VDF containing fluoropolymer may also be copolymerized with fluorine-free unsaturated olefin comonomers, e.g., ethylene, propylene or butadiene. Certain fluorine-containing diolefins are also useful, such as perfluorodiallylether and perfluoro-1,3-butadiene. Preferably at least 50% by weight of all monomers in a polymerizable mixture are fluorine-containing.

Additional examples of fluoroplastics useful in the invention are substantially non-VDF containing copolymers of substantially fluorinated and substantially non-fluorinated olefins. One of these substantially non-VDF containing copolymers is a terpolymer containing TFE, HFP and ethylene. For instance, a useful copolymer contains about 45 mol % to about 75 mol % of TFE units, about 10 mol % to about 30 mol % of HFP units, and about 10 mol % to about 40 mol % of ethylene units and has a melting point of about 140° C. to about 250° C.

Another example of a useful fluoroplastic in the present invention comprises interpolymerized units derived from TFE and allylic hydrogen-containing olefin monomer. International Publication No. WO 96/18665 (Greuel) describes fluoropolymers and preferred methods of producing interpolymerized units derived from TFE and polypropylene. The copolymers can generally contain, e.g., from about 2 weight percent to about 20 weight percent (preferably from about 5 weight percent to about 15 weight percent, more preferably from about 7 weight percent to about 12 weight percent) allylic hydrogen-containing olefin monomer. These semi-crystalline copolymers typically have melt temperatures so that they can be processed at temperatures below about 300° C., preferably from about 200° C. to about 250° C.

Examples of useful substantially non-VDF containing fluoropolymers of this type include poly(ethylene-co-tetrafluoroethylene), poly(tetrafluoroethylene-co-propylene), poly(chlorotrifluoroethylene-co-ethylene), and the terpolymer poly(ethylene-co-tetrafluoroethylene-co-hexafluoropropylene), as well as perfluorinated melt processable plastics, among others. Also, many usefull substantially non-VDF containing fluoropolymer materials are commercially available, for example from Dyneon, LLC, St. Paul, Minn., under the trade designations X68 10, and X6820; from Daikin America, Inc., Decatur, Ala., under the trade designations NEOFLON EP-541, EP-521, and EP-610; from Asahi Glass Co., Tokyo, Japan, under the trade designations AFLON COP C55A, C55AX, C88A; and from DuPont, Wilmington, Del., under the trade designations TEFZEL 230 and 290.

Many ways to make such polymers (including copolymers, terpolymers, etc.) are known. Such methods include, but are not limited to, suspension free-radical polymerization or conventional emulsion polymerization, which typically involve polymerizing monomers in an aqueous medium in the presence of an inorganic free-radical initiator system and surfactant or suspending agent. In general, the desired olefinic monomers can be copolymerized in an aqueous colloidal dispersion in the presence of water-soluble initiators which produce free radicals such as, for example, ammonium or alkali metal persulfates or alkali metal permanganates, and in the presence of emulsifiers such as, in particular, ammonium or alkali metal salts of perfluorooctanoic acid. See, for example, U.S. Pat. No. 4,335,238.

The substantially non-VDF containing fluoropolymers are comprised of essentially fluorinated and essentially non-fluorinated olefins. They can be prepared using a fluorinated sulfinate as a reducing agent and a water soluble oxidizing agent capable of converting the sulfinate to a sulfonyl radical. Preferred oxidizing agents are sodium, potassium, and ammonium persulfates, perphosphates, perborates, and percarbonates. Particularly preferred oxidizing agents are sodium, potassium, and ammonium persulfates.

Aqueous emulsion and suspension polymerizations can be carried out in conventional steady-state conditions in which, for example, monomers, water, surfactants, buffers and catalysts are fed continuously to a stirred reactor under optimum pressure and temperature conditions while the resulting emulsion or suspension is removed continuously. An alternative technique is batch or semibatch polymerization by feeding the ingredients into a stirred reactor and allowing them to react at a set temperature for a specified length of time or by charging ingredients into the reactor and feeding the monomer into the reactor to maintain a constant pressure until a desired amount of polymer is formed.

Substantially Non-Fluorinated Polymers

It is contemplated that the invention may also include a substantially non-fluorinated polymer component. The substantially non-fluorinated polymer component can provide added structural integrity and reduced cost, among other things.

Useful substantially non-fluorinated materials can include any of a number of well known, substantially non-fluorinated thermoplastic and elastomeric polymers. As used herein the term "substantially non-fluorinated" refers to polymers and polymeric materials having fewer than 10 percent of their carbon-bonded hydrogen atoms replaced with fluorine atoms. Preferably, the substantially non-fluorinated polymer has fewer than 2 percent of its carbon-bonded hydrogen atoms replaced with fluorine atoms, and more preferably fewer than 1 percent of its carbon-bonded hydrogen atoms are replaced with fluorine atoms.

Preferred substantially non-fluorinated thermoplastic polymers include polyamides, polyimides, polyurethanes, polyolefins, polystyrenes, polyesters, polycarbonates, polyketones, polyureas, polyacrylates and polymethacrylates. The particular substantially non-fluorinated polymer selected will depend upon the application or desired properties, such as chemical and/or flame resistance, of the composite article according to the invention.

Polyamides useful as the substantially non-fluorinated polymer are generally commercially available. For example, polyamides such as any of the well-known nylons are available from a number of sources. Particularly preferred polyamides are nylon-6, nylon-6,6, nylon-11, or nylon-12. It should be noted that the selection of a particular polyamide material should be based upon the physical requirements of the particular application for the resulting article. For example, nylon-6 and nylon-6,6 offer higher heat resistant properties than nylon-11 or nylon-12, whereas nylon-11 and nylon-12 offer better chemical resistant properties. In addition to those polyamide materials, other nylon materials such as nylon-6,12, nylon-6,9, nylon4, nylon-4,2, nylon4,6, nylon-7, and nylon-8 may also be used. Ring containing polyamides, e.g., nylon-6,T and nylon-6,1, may also be used. Polyether containing polyamides, such as PEBAX polyamides (Atochem North America, Philadelphia, Pa.), may also be used.

Useful polyurethane polymers include aliphatic, cycloaliphatic, aromatic, and polycyclic polyurethanes. These polyurethanes are typically produced by reaction of a polyfunctional isocyanate with a polyol according to well known reaction mechanisms. Useful diisocyanates for employment in the production of a polyurethane include dicyclohexylmethane-4,4'-diisocyanate, isophorone diisocyanate, 1,6-hexamethylene diisocyanate, cyclohexyl diisocyanate, and diphenylmethane diisocyanate. Combinations of one or more polyfunctional isocyanates may also be used. Useful polyols include polypentyleneadipate glycol, polytetramethylene ether glycol, polyethylene glycol, polycaprolactone diol, poly-1,2-butylene oxide glycol, and combinations thereof. Chain extenders, such as butanediol or hexanediol, may also optionally be used in the reaction. Commercially available urethane polymers useful in the present invention include: PN-3429 from Morton International, Inc., Seabrook, N.H., and X-4107 from B.F. Goodrich Company, Cleveland, Ohio.

The polyolefin polymers useful as the substantially non-fluorinated polymer are generally homopolymers or copolymers of ethylene, propylene, acrylic monomers, or other ethylenically unsaturated monomers, for example, vinyl acetate and higher alpha-olefins. Such polymers and copolymers can be prepared by conventional free-radical polymerization or catalysis of such ethylenically unsaturated monomers. The degree of crystallinity of the hydrocarbon polymer or copolymer can vary. The polymer may, for example, be a semi-crystalline high density polyethylene or may be an elastomeric copolymer of ethylene and propylene. Carboxyl, anhydride, or imide functionalities may be incorporated into the hydrocarbon polymer within the present invention, by polymerizing or copolymerizing functional monomers, for example, acrylic acid or maleic anhydride, or by modifying a polymer after polymerization, for example, by grafting, by oxidation or by forming ionomers. These include, for example, acid modified ethylene vinyl acetates, acid modified ethylene acrylates, anhydride modified ethylene acrylates, anhydride modified ethylene vinyl acetates, anhydride modified polyethylenes, and anhydride modified polypropylenes. The carboxyl, anhydride, or imide functional polymers useful as the hydrocarbon polymer are generally commercially available. For example, anhydride modified polyethylenes are commercially available from DuPont, Wilmington, Del., under the trade designation BYNEL coextrudable adhesive resins.

Polyacrylates and polymethacrylates useful as the substantially non-fluorinated polymer include, for example, polymers of acrylic acid, methyl acrylate, ethyl acrylate, acrylamide, methylacrylic acid, methyl methacrylate, and ethyl acrylate, to name a few. As mentioned above, other useful substantially non-fluorinated polymers include polyesters, polycarbonates, polyketones, and polyureas. These materials are generally commercially available, for example, SELAR polyester (DuPont, Wilmington, Del.); LEXAN polycarbonate (General Electric, Pittsfield, Mass.); KADEL polyketone (Amoco, Chicago, Ill.); and SPECTRIM polyurea (Dow Chemical, Midland, Mich.).

Preferred substantially non-fluorinated elastomeric polymers include acrylonitrile butadiene (NBR), butadiene rubber, chlorinated and chloro-sulfonated polyethylene, chloroprene, EPM, EPDM, epichlorihydrin (ECO), isobutylene isoprene, isoprene, polysulfide, polyurethane, silicone, PVC-NBR, styrene butadiene, and vinyl acetate ethylene. Examples of these compounds include Nipol 1052 NBR (Zeon, Louisville, Ky.), Hydrin 2000 ECO (Zeon, Louisville, Ky.), Hypalon 48 (Dupont, Wilmington Del.), and Nordel 2760P EPDM (Dupont, Wilmington Del.).

Substantially Non-Fluorinated Polymers having Pendant Amine Groups

Useful substantially non-fluorinated polymers having pendant amine groups preferably include any of the substantially non-fluorinated polymers described above so long as a pendant amine group is provided. More preferably, these non-fluorinated polymers having pendant amine groups contain one or more primary amine groups. For example, aliphatic di-, or polyamines mixed and reacted with a substantially non-fluorinated polymeric material described above can be used in a composite article according to the invention. The term "di-, or polyamines" as used within this description refers to organic compound containing at least two amine groups. By "aliphatic" it is meant that the nitrogen atoms of at least two of the two or more amines in the compound are bonded directly to only hydrogen atoms or aliphatic carbon atoms rather than being bonded directly to aromatic moieties or functional groups (e.g., carboxyl). For example, as "aliphatic di-, or polyamine" is used within the present description, aniline and urea are not aliphatic di-, or polyamines. Secondary amines are more preferred than tertiary amines and primary amines are most preferred. These amines modify a substantially non-fluorinated polymer which makes up the component of the composite article to which the blend is adhered.

Primary-amine containing polymers are obtained, for example, by reacting carboxyl-containing hydrocarbon elastomers with diamines, for example, 2-methylpentanediamine and N-aminoethylpiperazine. Most preferred are alkylene polyamines or diamines that comprise at least two primary amines, such as hexamethylene diamine, dodecyl diamine, and 2,4,8,10-tetraoxaspiro[5,5]undecane-3,9-dipropanamine. Such polymers and copolymers can be prepared by free radical polymerization of ethylenically unsaturated monomers.

A particularly useful non-fluorinated polymer (polyamide) having pendant amine groups is commercially available under the trade designation GRILAMID FE4943, now known as GRILAMID XE3595 and GRILAMID FE5405, both available from EMS Chemie AG (Switzerland). Other materials which may be modified with the addition of pendant amine groups include polyimides, polyesters, polycarbonates, polyketones, and polyureas. These materials are generally commercially available, for example, SELAR polyester from DuPont (Wilmington, Del.); LEXAN polycarbonate (General Electric, Pittsfield, Mass.); KADEL polyketone (Amoco, Chicago, Ill.); and SPECTRIM polyurea (Dow Chemical, Midland, Mich.).

Blend Component

The blend component used in the invention includes a first hydrogen containing fluoropolymer, and a substantially non-fluorinated polymer having one or more pendant primary or secondary amine groups, each described above. The blend component includes the first fluoropolymer in an amount from preferably about 5 wt. %, to about 95 wt. %, more preferably about 10 wt. %, to about 90 wt. % and most preferably about 25 wt. %, to preferably about 75 wt. %. The blend component also includes the substantially non-fluorinated polymer having pendant amine groups in an amount from preferably about 5 wt. %, to about 95 wt. %, more preferably about 10 wt. %, to about 90 wt. %, and most preferably about 25 wt. %, to about 75 wt. %.

Blends used in the invention may be formed by a variety of known techniques. These include melt mixing either by a batch mixing technique or a continuous extrusion process. Mixing and coating of polymeric dispersions, followed by thermal annealing, may also be used to form the blend component. Of course, material selection and choice of process may be determined by the end use requirements as well as melt viscosity and density ratios between the components.

When employing the blend component in the composite article, increased adhesion is observed by a greater peel strength value between the blend component and the component including a substantially non-fluorinated polymer when compared to a peel strength value between a component consisting of a fluoropolymer and a component consisting of a substantially non-fluorinated polymer. This is particularly significant in applications where long durability of a composite article is required, such as in automobile fuel lines where a fuel hose is continually exposed to petrochemicals (e.g., fuel).

Optional Additives

The composite articles in accordance with the invention may also include optional additives, such as those typically used in other thermoplastic applications. The optional additives are preferably selected from the group of a polymer, a pigrnent, a tackifier, a filler, an electrically conductive material (examples of which are described in U.S. Pat. No. 5,552,199), an electrically insulative material, a stabilizer, an antioxidant, a lubricant, a processing aid, an impact modifier, a viscosity modifier, and a mixture thereof.

Discussion of the Drawings

The present invention, and the orientation of the previously described components within those components, will be further understood by referenced to the FIGURES.

Referring first to FIG. 1, a cross-sectional view is shown of a two component construction 10 according to the invention. This embodiment may comprise a film a sheet, a tube, a wire coating, a cable jacket, a container wall, etc. Construction 10 comprises a first layer 12 having first and second surfaces 14 and 16 respectively, and a second layer 18 bonded to the first surface 14.

First layer 12 comprises a blend component of a first fluoropolymer and a substantially non-fluorinated polymer having pendant amine groups. The blend layer 12 is advantageous because it can provide a chemical barrier to the construction 10. Second layer 18 comprises a substantially non-fluorinated polymer and provides added structural integrity to the composite article.

Referring now to FIG. 2, a three layer construction according to the invention is generally shown as a cross-sectional view of a tubing or a hose segment 20. The first, or outer layer or wall 26 provides structural integrity to the composite article and is preferably made from a substantially non-fluorinated polymer. An intermediate layer 24 provides adhesion between outer layer 26 and an inner layer 22. The intermediate layer 24 comprises a blend of a first fluoropolymer and a substantially non-fluorinated polymer having pendant amine groups. The inner layer 22 provides the chemical and/or thermal barrier to the composite article 20 and is preferably made from a second fluoropolymer. In this embodiment, inner layer 22 faces the lumen 28 which provides the passageway for the chemical desired in the intended use of the composite article, such as fuel or vapor lines in an automobile fuel system.

Alternatively, if the chemical and/or flame resistance is desired on the outer surface of a composite article, these layers may be reversed. Referring to FIG. 3, another preferred embodiment of the invention is a composite article generally shown as a cross-sectional view of a coated wire/cable 30. The wire or cable 37 is surrounded by the inner layer 36 which is formed from a substantially non-fluorinated polymer. The intermediate layer 34 is preferably made from a blend comprising a first fluoropolymer and a substantially non-fluorinated polymer having pendant amine groups, while an optional outer layer 32 is preferably made from a second fluoropolymer. The optional outer layer 32 provides a barrier, e.g., the chemical resistance and/or electrical insulating properties to the composite article.

In the constructions of FIGS. 2 and 3, the peel strength between the blend layer (layers 24 and 34 respectively) and the layer of a substantially non-fluorinated polymer (layers 26 and 36 respectively) is greater than the peel strength that would exist between the layer of a fluoropolymer (layers 22 and 32 respectively) and the layer of the substantially non-fluorinated polymer (layers 26 and 36 respectively) if they were bonded directly to each other and tested under the same conditions.

In any of these embodiments, the fluoropolymer used in the blend layer and the fluoropolymer layer used in the layer providing the barrier can be the same or different fluoropolymer, such as those previously described. Preferably, the fluoropolymers are compatible with one another. Most preferably, they are the same or similar.

In any of the embodiments of the invention, the various layers are bonded to the adjacent layer or layers. Preferably, they are intimately bonded to the adjacent layer or layers. As used herein, the term "intimately bonded" means that the components or layers are not easily physically separated without substantially destroying the composite or multi-layer article. Additionally, any of the embodiments contemplated by the invention can be provided in a form of a sheet or film regardless of the specific embodiment illustrated in the FIGS. Further, the order of the layers may be reversed in any of these embodiments. Determination of what comprises the inner and outer layers is influenced by where the barrier properties are desired.

Composite Article Formation

Methods known in the polymer art can be used to produce a composite article, such as a bonded multi-layer article, wherein the blend material is in substantial contact with the substantially non-fluorinated polymeric material. For instance, the blend can be formed by known methods into thin films or thicker sheets. These films or sheets can be laminated together under heat and/or pressure to form a bonded multi-layer article. Alternatively, the blend component and the substantially non-fluorinated polymer can be simultaneously co-extruded into a multi-layer article.

The formulation of the blend component may also be accomplished during the formulation of the composite article. For instance, the first fluoropolymer and the substantially non-fluorinated polymer having pendant amine groups may be fed to and melt mixed by the same extruder being employed during the co-extrusion process.

In addition, all of these methods can be used to apply additional polymeric components or layers either before, during, or after the formation of the blend component. For instance, a component including a second fluoropolymer can be applied to the blend component and then a component including the substantially non-fluorinated polymer can be applied to the blend layer opposite the component including the first fluoropolymer.

Conditions by which two or more components are brought together (e.g., sequential extrusion, co-extrusion or lamination, to name a few) may be sufficient to provide adequate adhesion between the components. However, it may be desirable to further treat the resulting composite article with, for example, heat and/or pressure to improve adhesion. One way to supply additional heat, for example, is to slow the rate of cooling after extrusion of the components. Also, additional heat or energy can be added during or after extrusion or lamination processes, wherein the temperatures may be higher than that required for merely processing the components. Further, the complete composite article may be held at an elevated temperature and/or pressure for an extended period of time, such as in an oven, an autoclave, a heated liquid bath and the like. A combination of these methods can also be used.

The many advantages of a composite article in accordance with the invention are further illustrated by the following non-limiting examples in which all parts and percentages are given as parts and percentages by weight unless otherwise stated.

EXAMPLES

In the following Examples and Comparative Examples, various composites were prepared and the adhesion between the components, or layers, was evaluated. All concentrations and percentages are by weight unless otherwise indicated. The abbreviations for the materials used are defined according to the following schedule shown in Table 1.

TABLE 1

| Abbreviation | Description |
| --- | --- |
| PA (substantially non-fluorinated polymer having pendant amine groups) | an amine pendant polyamide 12, commercially available from EMS Chemie AG, Switzerland, under the trade designation GRILAMID FE 4943 |
| NF (substantially non-fluorinated polymer) | polyamide 12, commercially available from Huls America, Piscataway, NJ under the trade designation Vestamid ™ |
| FEP | a film made from perfluorinated ethylene-propylene, commercially available from DuPont |
| POLYMER 1 | a terpolymer of ethylene, tetrafluoroethylene and hexafluoropropylene, commercially available from Dyneon LLC, St. Paul, MN, under the trade designation X6820 |
| POLYMER 2 | 91% tetrafluoroethylene (TFE)- 9% propylene (P) (percent by weight); $T_m$ of 205° C. |

POLYMER 2 was prepared by the method described in International Publication No. WO 96/18665 (Greuel). In particular, a 150 L vertically stirred polymerization reactor was charged with 120,000 g deionized water, 70 g KOH, 430 g $K_2HPO_4$, 694 g ammonium perfluorooctanoate, 1,023 g of a 20% solution of $C_4F_9SO_2Na$ in deionized water. The reactor was then alternately evacuated and purged with $N_2$ until the level of $O_2$ was less than about 50 ppm. The reactor was then evacuated, the temperature raised to about 71° C., and the agitation speed set about 210 rpm. Next, the reactor was charged with about 3929 g of TFE and about 79 g of propylene to give a pressure of about 15.2 bar (220 psig). The polymerization was initiated by feeding a 5% solution of $(NH_4)_2S_2O_8$ in deionized water to the reactor by means of a metering pump at approximately 25 g/minute until 1 equivalent of $(NH_4)_2S_2O_8$ was fed (about 3,200 g of solution). Upon the observation of a pressure drop, the running feed, which consisted of 91% TFE and 90% propylene, was started and continuously adjusted by the reactor's control system in order to maintain the desired pressure. The polymerization was halted by slowing agitation after 31,300 g of TFE and 3,080 g of propylene had been fed, 5 hours after start of running feed to give a calculated average reaction rate of 57 g/L-h. The reactor was then vented, cooled, and drained to isolate the latex. The resulting polymer was coagulated by adding HCl to the latex, granulated, washed six times with deionized water, and dried overnight in an oven at about 120° C.

EXAMPLE 1

In Example 1, 13.2 g of PA and 26.8 g of POLYMER 1 were blended using a RHEOMIX™ 600 internal bowl mixer equipped with roller blades, available from Haake Buchler Instruments Inc., set at a temperature of 220° C. and a mixer rotor setting of 50 rpm. The pellets of the two components were added to the mixing bowl and blended for three minutes. The internal-bowl mixed compound was then removed from the mixer and molded at 230° C. into a sheet approximately 0.0254 cm using a 0.0254 cm shim stock and a Wabash Hydraulic Press Co. heated platen press.

A composite was made with 1.25 cm by 5.08 cm samples of the blend sheet and a 2.54 cm by 7.62 cm by a 0.038 cm thick sheet of POLYMER 1. A 2.54 cm by 7.62 cm by a 0.32 cm thick sheet of NF was placed on the other side of the blend sheet such that a final structure was the layer of NF, the middle layer the blend and a third layer of POLYMER 1. Referring to FIG. 4, a layered construction 40 used in testing layer adhesion is shown. The POLYMER 1 layer 46 and the NF layer 48 extended beyond the blend layer 44 for testing purposes.

The adhesion between the layers was tested using ASTM D-1876, commonly known as a "T-peel" test. To facilitate testing via the T-peel test, a sheet of 0.00762 cm perfluorinated ethylene-propylene (FEP) film was placed between the POLYMER 1 layer 46 and NF layer 48. The FEP film was inserted about 1.25 cm only along the shorter edge of the 2.54 cm by 7.62 cm of the blend layer 44 as the composite was pressed and heated. The FEP film did not adhere to either of the layers and was used only to create a POLYMER 1 "tab" and a NF "tab" to insert into the jaws of the test device.

Three identical composites were simultaneously heated under pressure using a Wabash Hydraulic Press Co. heated platen press at 230° C. and 686 kPa for 3 minutes. The samples were removed from the press and allowed to cool to room temperature. Peel strength or adhesion was measured on the samples in accordance with ASTM D 1876 (T-Peel test). An INSTRON™ Model 1125 tester, available from Instron Corp., set at a 100 mnim/min crosshead speed was used as the test device. The peel strength was calculated as the average load measured during the peel test.

COMPARATIVE EXAMPLE C1

In Comparative Example C1, a composite sample was prepared and tested as in Example 1, except that the middle layer consisted of a 2.54 cm by 5.08 cm by a 0.0254 cm thick sheet of PA.

EXAMPLE 2

In Example 2, 13.2 g of PA and 26.8 g of POLYMER 2 were blended using a RHEOMIX™ 600 internal bowl mixer equipped with roller blades, available from Haake Buchler Instruments Inc., set at a temperature of 220° C. and a mixer rotor setting of 50 rpm. The pellets of the two components were added to the mixing bowl and blended for three minutes. The internal-bowl mixed compound was then removed from the mixer and molded at 230° C. into a sheet approximately 0.0254 cm using a 0.0254 cm shim stock and a Wabash Hydraulic Press Co. heated platen press.

A composite was made with 1.25 cm by 5.08 cm samples of the blend and a 2.54 cm by 7.62 cm by a 0.038 cm thick sheet of POLYMER 2. A 2.54 cm by 7.62 cm by a 0.32 cm thick sheet of NF was placed on the other side of the blend so that a final structure included a layer of NF, the middle layer of a blend and a third layer of a 0.038 cm sheet of POLYMER 2.

COMPARATIVE EXAMPLE C2

In Comparative Example 2, a composite sample was prepared and tested as in Example 2, except that the middle layer consisted of a 2.54 cm by 5.08 cm by 0.0254 cm thick sheet of PA.

All Examples and Comparative Examples were tested as explained in Example 1 above. Results are shown in Table 2. Peel Strength Values are shown and the layer interface which separated during testing is also reported.

TABLE 2

| Example | Peel Strength Value (kg./2.54 cm) | Interface Failure |
|---|---|---|
| 1 | 14.5 | POLYMER 1/ blend layers |
| C1 | 5.9 | POLYMER 1 /PA layers |
| 2 | 3.0 | POLYMER 2/ blend layers |
| C2 | 0.2 | POLYMER 2 /PA layers |

It is evident from the above examples and comparative examples that a composition consisting of a blend of a first fluoropolymer and a substantially non-fluorinated polymer having pendant amine groups may be used to give improved adhesion of the first fluoropolymer to a substantially non-fluorinated polymers.

The complete disclosures of all patents, patent applications, and publications are incorporated herein by reference as if individually incorporated. Various modifications and alterations of this invention will become apparent to those skilled in the art without departing from the scope and spirit of this invention, and it should be understood that this invention is not to be unduly limited to the illustrative embodiments set forth herein.

what is claimed is:

1. A composite article comprising:
   (a) a blend component having first and second surfaces, the blend component comprising:
      (i) a hydrogen containing fluoropolymer comprising a fluoropolymer that contains less than 3% by weight of interpolymerized units derived from vinylidene fluoride or other monomer units which when incorporated into the fluoropolymer provide a microstructure of a carbon bonded hydrogen atom between carbon bonded fluorine atoms to create an amine reactive site; and
      (ii) a substantially non-fluorinated polymer having one or more pendant primary or secondary amine groups; and
   (b) a second substantially non-fluorinated polymer component adhered to the first surface of the blend component.

2. The composite article of claim 1 wherein component (a)(i) is a fluoroplastic.

3. The composite article of claim 1 wherein the substantially non-vinylidene fluoride-containing fluoropolymer of component (a)(i) is formed of interpolymerized units of (i) a fluorine-containing monomer selected from hexafluoropropylene, tetrafluoroethylene, chlorotrifluoroethylene, a fluorinated vinyl ether, or combinations thereof, and of (ii) a fluorine-free, hydrogen containing unsaturated olefin comonomer, and optionally, of (iii) an iodine- or bromine-containing unsaturated olefin monomer.

4. The composite article of claim 3 wherein the fluorine-free, hydrogen containing unsaturated olefin monomer is selected from ethylene, propylene, or butadiene, and the iodine- or bromine-containing unsaturated olefin monomer is selected from bromodifluoroethylene, bromotrifluoroethylene, iodotrifluoroethylene, or 4-bromo-3,3,4,4-tetrafluoro-1-butene.

5. The composite article of claim 3 wherein the substantially non-vinylidene fluoride-containing fluoropolymer of component (a)(ii) is formed of interpolymerized units of tetrafluoroethylene and at least one other monomer selected from the group consisting of hexafluoropropylene, a fluorinated vinyl ether, ethylene, and propylene, provided that at least one of the other monomers contains hydrogen.

6. The composite article of claim 1 wherein the component (a)(ii) is selected from a polyamide, a polyimide, a polyurethane, a polyolefin, a polystyrene, a polyester, a polycarbonate, a polyketone, a polyurea, a polyacrylate, or a polymethacrylate.

7. The composite article of claim 1 wherein the component (a)(ii) is an elastomer.

8. The composite article of claim 1 wherein the component (a)(ii) has a pendant primary amine group.

9. The composite article of claim 1 wherein the blend component comprises:
about 5% by weight to about 95% by weight of the fluoropolymer and about 5% by weight to about 95% by weight of the substantially non-fluorinated polymer having one or more pendant primary or secondary amine groups.

10. The composite article of claim 1 wherein the blend component comprises:
about 10% a by weight to about 90% by weight of the fluoropolymer and about 10% by weight to about 90% by weight of the substantially non-fluorinated polymer having one or more pendant primary or secondary amine groups.

11. The composite article of claim 1 wherein the blend component comprises:
about 25% by weight to about 75% by weight of the fluoropolymer and about 25% by weight to about 75% by weight of the substantially non-fluorinated polymer having one or more pendant primary or secondary amine groups.

12. The composite article of claim 1 which is shaped.

13. The composite article of claim 12 selected from the group of a wire coating, a tube, a container, a sheet, a cable jacket, or a film.

14. The composite article of claim 1 wherein component (b) has the same composition to that of component (a)(ii).

15. The composite article of claim 14 wherein the component (b) is selected from a polyamide, a polyimide, a polyurethane, a polyolefin, a polystyrene, a polyester, a polycarbonate, a polyketone, a polyurea, a polyacrylate, or a polymethacrylate.

16. The composite article of claim 14 wherein component (a)(ii) is a substantially non-fluorinated polymer having one or more primary or secondary amine groups selected from the group consisting of a polyamide, a polyimide, a polyurethane, a polyolefin, a polystyrene, a polyester, a polycarbonate, a polyketone, a polyurea, a polyaciylate, and a polymethacrylate.

17. The composite article of claim 1 wherein the component (a)(ii) and the component (b) is a polyamide.

18. The composite article of claim 1 wherein the component (b) is an elastomer.

19. The composite article of claim 1 further comprising a second fluoropolymer component adhered to the second surface of the blend component.

20. The composite article of claim 19 wherein the second fluoropolymer comprises a substantially non-vinylidene fluoride containing fluoropolymer component.

21. The composite article of claim 20 wherein the second fluoropolymer component is formed of interpolymerized units of tetrafluoroethylene and at least one other monomer selected from the group consisting of hexafluoropropylene, a fluorinated vinyl ether, ethylene, and propylene.

22. The composite article of claim 28 wherein the second fluoropolymer is formed of interpolymerized units of (i) a fluorine-containing monomer selected from hexafluoropropylene, tetrafluoroethylene, chlorotrifluoroethylene, a fluorinated vinyl ether, or combinations thereof, and (ii) a fluorine-free unsaturated olefin comonomer, and optionally, (iii) an iodine- or bromine-containing unsaturated olefin monomer.

23. The composite article of claim 22 wherein the fluorine-free unsaturated olefin monomer is selected from ethylene, propylene, or butadiene, and the iodine- or bromine-containing unsaturated olefin monomer is selected from bromodifluoroethylene, bromotrifluoroethylene, iodotrifluoroethylene, or 4-bromo-3,3,4,4-tetrafluoro-1-butene.

24. The composite article of claim 19 wherein the two fluoropolymers are compatable with one another.

25. The composite article of claim 19 wherein the second fluoropolymer component comprises interpolymerized units of vinylidene fluoride monomer or interpolymerized units of other monomers which, when polymerized, form a microstructure sequence of a carbon bonded hydrogen atom between carbon bonded fluorine atoms to create an amine reactive site.

26. The composite article of claim 25 wherein the second fluoropolymer comprises a fluoropolymer of interpolymerized units derived from (i) at least one fluorine-containing monomer selected from the group of vinylidene fluoride, trifluoroethylene, 1-hydropentafluoropropylene, 2-hydropentafluoropropylene, and, optionally, (ii) at least one monomer copolymerizable therewith.

27. The composite article of claim 26 wherein the monomer (ii) is selected from (a) a fluorine-containing monomer, (b) a fluorine-free unsaturated olefin monomer, (c) an iodine- or a bromine-containing unsaturated olefin monomer, or (d) a combination thereof.

28. The composite article of claim 27 wherein,
(a) the fluorine-containing monomer is selected from hexafluoropropylene, tetrafluoroethylene, chlorotrifluoroethylene, a fluorinated vinyl ether, or a fluorine-containing di-olefin;
(b) the fluorine-free unsaturated olefin monomer is selected from ethylene, propylene, or butadiene; and
(c) the iodide- or bromide-containing unsaturated olefin monomer is selected from bromodifluoroethylene, bromotrifluoroethylene, iodotrifluoroethylene, or 4-bromo-3,3,4,4-tetrafluoro-1-butene.

29. The composite article of claim 1 further comprising at least one additive in at least one of the components.

30. A multi-layer composite article comprising, in order:
   a first layer comprising a fluoropolymer;
   a second layer comprising a blend of
      (i) a hydrogen containing fluoropolymer comprising a fluoropolymer that contains less than 3% by weight of interpolymerized units derived from vinylidene fluoride or other monomer units which when incorporated into the fluoropolymer provide a microstructure of a carbon bonded hydrogen atom between carbon bonded fluorine atoms to create an amine reactive site; and
      (ii) a substantially non-fluorinated polymer having one or more pendant primary or secondary amine groups; and
   a third layer comprising a second substantially non-fluorinated polymer layer, wherein a peel strength value between the second layer and the first layer is greater than a peel strength value between a component consisting of the first layer and a component consisting of a substantially non-fluorinated polymer having one or more pendant primary or secondary amine groups.

31. The composite article of claim 30 wherein the fluoropolymers of the first and second layers may have the same or different composition.

32. The composite article of claim 31 wherein at least one of the fluoropolymers of the first and second layers is formed of interpolymerized units of (i) a fluorine-containing monomer selected from hexafluoropropylene, tetrafluoroethylene, chlorotrifluoroethylene, a fluorinated vinyl ether, or combinations thereof, and (ii) a fluorine-free hydrogen containing unsaturated olefin comonomer, and optionally, (iii) an iodine- or bromine-containing unsaturated olefin monomer.

33. The composite article of claim 32 wherein the fluorine-free, hydrogen containing unsaturated olefin monomer is selected from ethylene, propylene, or butadiene, and the iodine- or bromine-containing unsaturated olefin monomer is selected from bromodifluoroethylene, bromotrifluoroethylene, iodotrifluoroethylene, or 4-bromo-3,3,4,4-tetrafluoro-1-butene.

34. The composite article of claim 32 wherein at least one of the fluoropolymers of the first and second layers is formed of interpolymerized units of tetrafluoroethylene and at least one other monomer selected from the group consisting of hexafluoropropylene, a fluorinated vinyl ether, ethylene, and propylene, provided that at least one of the other monomers contains hydrogen.

35. The composite article of claim 30 wherein the fluoropolymer of the first layer is different from that of the second layer and the fluoropolymer of the first layer comprises interpolymerized units of vinylidene fluoride monomer or interpolymerized units of one or more other monomers which, when polymerized, form a polymer sequence of a carbon bonded hydrogen atom between carbon bonded fluorine atoms to create an amine reactive site.

36. The composite article of claim 35 wherein the fluoropolymer of the first layer comprises a fluoropolymer of interpolymerized units derived from (i) at least one fluorine-containing monomer selected from the group of vinylidene fluoride, trifluoroethylene, 1-hydropentafluoropropylene, 2-hydropentafluoropropylene, and, optionally, (ii) at least one monomer copolymerizable therewith.

37. The composite article of claim 36 wherein the monomer (ii) is selected from a fluorine-containing monomer, a fluorine-free, unsaturated olefin monomer, an iodine- or a bromine-containing unsaturated olefin monomer, or a combination thereof.

38. The composite article of claim 37 wherein
   (a) the fluorine-containing monomer is selected from hexafluoropropylene, tetrafluoroethylene, chlorotrifluoroethylene, a fluorinated vinyl ether, or a fluorine-containing di-olefin;
   (b) the fluorine-free, unsaturated olefin monomer is selected from ethylene, propylene, or butadiene; and
   (c) the iodide- or bromide-containing unsaturated olefin monomer is selected from bromodifluoroethylene, bromotrifluoroethylene, iodotrifluoroethylene, or 4-bromo-3,3,4,4-tetrafluoro-1-butene.

39. A shaped multi-layer composite article of claim 30.

40. The shaped article of claim 39 selected from a wire coating, a tube, a container, a sheet, a cable jacket, or a film.

41. The shaped multi-layer composite article of claim 39 further comprising at least one additive in at least one of the layers.

* * * * *

UNITED STATES PATENT AND TRADEMARK OFFICE
CERTIFICATE OF CORRECTION

PATENT NO.: 6,077,609
DATED: June 20, 2000
INVENTOR(S): Thomas J. Blong, Edward E. Parsonage It is certified that error appears in the above-identified patent and that said Letters Patent is hereby corrected as shown below:

Col. 12, line 53; "C4F9SO2Na" should be -- $C_4F_9SO_2Na$ --.

Col. 12, line 65; "90%" should be -- 9% --.

Col. 13, line 50; "100 mnim/min" should be -- 100 mm/min --.

Claim 1, Column 14, line 63; "rnore" should be -- more --.

Claim 5, Column 15, line 22; "(a)(ii)" should be -- (a)(i) --.

Claim 10, Column 15, line 45; "about 10% a by weight" should be --about 10% by weight--.

Claim 16, Column 16, line 6; "polyaciylate" should be -- polyacrylate --.

Claim 22, Column 16, line 23; "article of Claim 28" should be -- article of Claim 20 --.

Signed and Sealed this

Seventeenth Day of April, 2001

Attest:

NICHOLAS P. GODICI

Attesting Officer     Acting Director of the United States Patent and Trademark Office